United States Patent [19]
de Paul Humeau et al.

[11] Patent Number: 5,521,646
[45] Date of Patent: May 28, 1996

[54] GEOMETRY AND CONVERGENCE CORRECTION FOR PROJECTION TELEVISION APPARATUS

[75] Inventors: Vincent de Paul Humeau, Trelaze, France; Günter Gleim, Villengen-Schwenningen; Jacques Chauvin, Mönchweiler, both of Germany

[73] Assignee: Deutsche Thomson-Brandt GmbH, Villengen-Schwenningen, Germany

[21] Appl. No.: 287,695

[22] Filed: Aug. 9, 1994

[30] Foreign Application Priority Data

Aug. 11, 1993 [DE] Germany ........................ 43 26 899.4

[51] Int. Cl.⁶ ........................................... H04N 5/74
[52] U.S. Cl. ........................ 348/744; 348/746; 348/807; 315/368.18
[58] Field of Search ................................ 348/744, 746, 348/805, 747, 807, 809, 745; 315/371, 368.18, 368.23, 180, 189, 190, 191, 474; H04N 5/74, 9/31, 5/68, 9/16, 9/20, 9/28, 3/22, 3/26, 3/23, 3/233, 3/227

[56] References Cited

U.S. PATENT DOCUMENTS

| | | | |
|---|---|---|---|
| 4,816,908 | 3/1989 | Colineau et al. | 315/368.18 |
| 4,935,674 | 6/1990 | Rodriguez-Cavazos | 315/368 |
| 4,961,030 | 10/1990 | Ogino et al. | 315/368 |
| 5,138,222 | 8/1992 | Toide et al. | 313/474 |
| 5,166,576 | 11/1992 | Roussel et al. | 313/431 |
| 5,179,319 | 1/1993 | Iwasaki et al. | 313/440 |
| 5,282,033 | 1/1994 | Gleim | 348/180 |

FOREIGN PATENT DOCUMENTS

| | | |
|---|---|---|
| 3732002 | 4/1989 | Germany . |
| 3942736 | 6/1990 | Germany . |
| 4-086192 | 3/1992 | Japan . |
| 4-150392 | 5/1992 | Japan . |

*Primary Examiner*—Safet Metjahic
*Assistant Examiner*—Nina N. West
*Attorney, Agent, or Firm*—Joseph S. Tripoli; Joseph J. Laks; Harvey D. Fried

[57] ABSTRACT

A projection television apparatus has three monochromatic picture tubes disposed in a planar orientation defining a central picture tube and two outer picture tubes. Each of the picture tubes includes a deflection unit responsive to deflection currents and raster correction signals for vertical and horizontal deflection. A control circuit, including a signal generator, supplies vertical and horizontal raster correction signals formulated for the central picture tube to all three of the picture tubes and supplies additional vertical and horizontal raster correction signals formulated for the two outer picture tubes respectively to the two outer picture tubes, respectively. Conductive paths for the formulated for the central picture tube correction signals can include variable resistors for effecting small changes in signal amplitude.

6 Claims, 1 Drawing Sheet

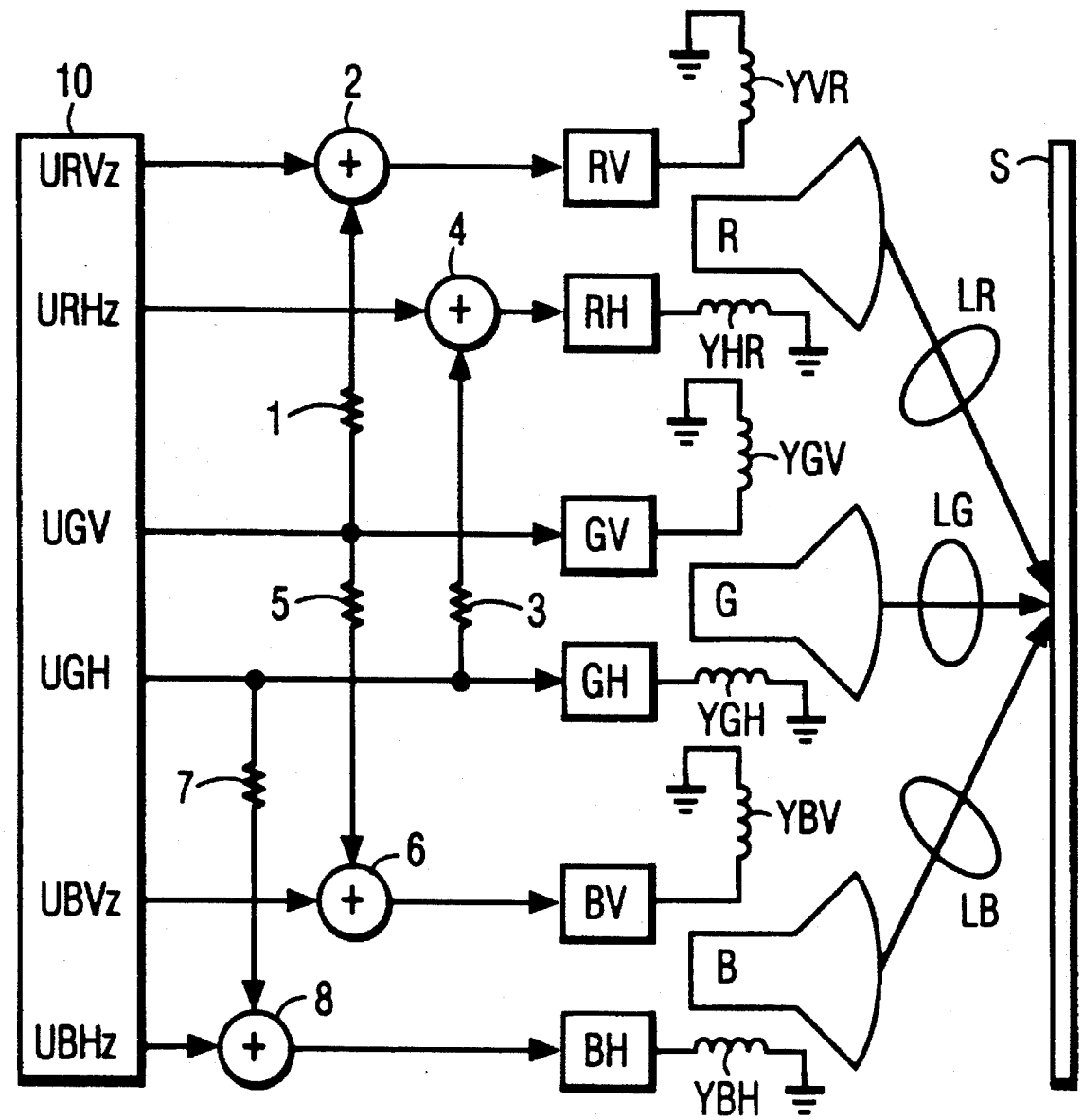

GEOMETRY AND CONVERGENCE CORRECTION FOR PROJECTION TELEVISION APPARATUS

BACKGROUND OF THE INVENTION

1. Field of the Invention

The invention relates to a projection television apparatus having three monochromatic picture tubes disposed in a planar orientation defining a central picture tube and two outer picture tubes. Each picture tube is provided with main vertical and horizontal deflection coils and auxiliary vertical and horizontal raster correction deflection coils.

2. Description of Related Art

In projection television apparatus, correction signals which compensate for defects in the raster coincidence, the picture tube geometry, the keystone distortion, the convergence and other defects, have to be supplied to each of the three picture tubes, in addition to the usual deflection signals for the horizontal deflection and the vertical deflection. Correction signals of this type are generally supplied to additional or auxiliary deflection coils which are arranged adjacent to the main deflection coils for the deflection in the horizontal deflection or the vertical direction and which have an appreciably reduced inductance relative to the main deflection coils.

New kinds of picture tubes have a curved phosphor screen. Such kinds of tubes make it possible to have a smaller separation between the picture tubes and the projection screen and thus a smaller depth of housing for the projection television receiver. On the other hand, such kinds of picture tubes require a greater amount of correction of the picture geometry.

SUMMARY OF THE INVENTION

The object of the invention is to develop a simple circuit for the correction of the raster for a projection television apparatus which is particularly suitable for picture tubes using a curved phosphor screen, which makes it possible to generate and use a lesser amount of correction for the two outer picture tubes and which results in a lower, long term drift.

The invention is based upon the following perceptions and considerations. To start with, correction signals are supplied to the central picture tube, which is usually the picture tube for the green color, for effecting the optimal correction as regards all of the parameters for this central picture tube. Until now, separately generated correction signals were supplied to the two outer picture tubes respectively, because the geometrical proportions and the defects are different for the outer picture tubes. In accordance with an inventive arrangement, the correction signals supplied to the central picture tube are now also supplied to each of the two outer picture tubes; either unaltered, or, with only a suitably small change in their amplitude. This technique achieves a far reaching basic correction for the two outer picture tubes as well, based upon a certain similarity of the three picture tubes. Of course, the correction for the two outer picture tubes is not thereby entirely complete. Rather, an additional correction signal is still necessary for each of these two outer tubes. However, due to the basic correction that has already been achieved for the central picture is tube, this additional correction can be approximately 40% smaller than the correction which would otherwise be required. For the most part, additional correction for the two outer picture tubes is required only for convergence correction. Thus, the correction signals used for the central picture tube, as well as the correction achieved thereby, are utilized as a reference for the convergence correction of the two outer picture tubes.

The inventive arrangement provides a number of advantages. Firstly, a better resolution is achieved for the two outer picture tubes in general, that is, for the red and blue picture tubes. Secondly, since the basic correction signal for the central picture tube is also effective for each of the two outer picture tubes, there arises a particular advantage as regards long term variations, referred to as drift. Any drift of the central picture tube is inevitably imparted to the two outer picture tubes. The arrangement thus provides a correlated drift for all three picture tubes, whereby any variations of the picture are less visible. Overall, a better long term consistency of the corrections is achieved. Thirdly, the circuit for generating the correction signals for the outer picture tubes can be less complex, and therefore less expensive.

In accordance with an inventive arrangement, a projection television apparatus having three monochromatic picture tubes disposed in a planar orientation defining a central picture tube and two outer picture tubes, each of the picture tubes including a deflection unit responsive to deflection currents and raster correction signals for vertical and horizontal deflection, the apparatus comprises: means for supplying vertical and horizontal s raster correction signals formulated for the central picture tube to all three of the picture tubes; and, means for supplying additional vertical and horizontal raster correction signals formulated for the two outer picture tubes respectively to the two outer picture tubes, respectively. The means for supplying the vertical and to horizontal raster correction signals formulated for the central picture tube to the two outer picture tubes comprises conductive paths each having signal amplitude altering means one of the additional correction signals in amplitude.

BRIEF DESCRIPTION OF THE DRAWING

The sole FIGURE is a block diagram showing a projection television apparatus with a correction circuit according to an inventive arrangement.

DETAILED DESCRIPTION OF THE PREFERRED EMBODIMENTS

The FIGURE shows three monochromatic picture tubes R, G, B for the primary colors red, green and blue. The images produced by the picture tubes R, G, B are projected via lenses LR, LG and LB onto the screen S so that they produce a colored image on the screen S.

Additional or auxiliary correction deflection coils for the vertical deflection and the horizontal deflection are associated with each of the picture tubes R, G, B. For simplicity, the main deflection coils for the vertical deflection and the horizontal deflection are not illustrated. A control circuit 10, including means for generating a plurality of different waveforms, produces a correction signal, voltage UGV, for the vertical/green correction and a correction signal, voltage UGH, for the horizontal/green correction. These correction signals are supplied through amplifiers GV and GH to the corresponding auxiliary correction coils YGV, YGH of the picture tube G. In addition, the correction voltage UGV reaches an adding stage 2 through a resistor 1, and from the adding stage 2, reaches the correction coil YVR for the vertical/red correction through the s amplifier RV. Likewise, the correction voltage UGH reaches the adding stage 4 through a resistor 3, and from the adding stage 3, reaches the correction coil YHR for the horizontal/red correction through the amplifier RH. The correcting voltage UGV likewise reaches the correction coil YBV for vertical/blue through the resistor 5, the adding stage 6 and the amplifier BV; while the correcting voltage UGH likewise reaches the correction coil YBH for horizontal/blue through the resistor 7, the adding stage 8 and the amplifier BH. It is apparent, that the two correcting voltages UGV and UGH, which provide the entire correction needed for the central picture tube G by themselves, now reach the correction coils for the outer picture tubes R and G practically unaltered. The resistors 1, 3, 5, 7 only serve for exactly matching the amplitudes and could, if necessary, be dispensed with. Due to this correlated correction of the picture tubes R, G, B using UGV and UGH, a far reaching basic correction is also achieved for the picture tubes R and B.

The circuit 10 provides an additional correcting voltage URVz, which is added to the correcting voltage UGV in the adding stage 2, for the vertical/red correction. The additional correcting voltage causes a small correction, relative to the basic correction, of the raster parameters, in particular, of the convergence. Likewise, a correcting voltage URHz is added to the correcting voltage UGH in the adding stage 4 for the fine correction of the horizontal/red. In a similar manner, a fine correcting voltage UBVz for the picture tube B is added to the correcting voltage UGV in the adding stage 6 and a fine correcting voltage UBHz is added to the correcting voltage UBH in the adding stage 8.

It will be appreciated that the necessary waveforms for correcting particular kinds of distortion in projection television apparatus are generally known and, in any event, are dependent upon the precise relative positions and alignment of the picture tubes and the screen. Accordingly, specific correction waveforms need not be illustrated to understand the invention. Suitable control circuits and waveform generators are also known in the art, and also need not be illustrated in detail to understand the invention.

The invention is applicable to projection television apparatus using front projection as well as rear or backward projection. The correction circuits for the correction signals may be constructed in analog or digital fashion. The invention can be used to particular advantage with picture tubes using a curved phosphor screen, but is not limited to such picture tubes.

What is claimed is:

1. A projection television apparatus having three monochromatic picture tubes disposed in a planar orientation defining a central picture tube and two outer picture tubes, each of said picture tubes including a deflection unit responsive to deflection currents and raster correction signals for vertical and horizontal deflection, the apparatus comprising:

means for supplying vertical and horizontal raster correction signals formulated for said central picture tube to all three of said picture tubes, said means for supplying said vertical and horizontal raster correction signals formulated for said central picture tube to said two outer picture tubes having conductive paths each having signal amplitude altering means; and, means for supplying additional vertical and horizontal raster correction signals respectively formulated only for said two outer picture tubes to said two outer picture tubes, respectively.

2. The apparatus of claim 1, wherein each of said picture tubes has a curved phosphor screen.

3. The apparatus of claim 1, wherein said central picture tube is for the primary color green.

4. The apparatus of claim 1, wherein said additional correction signals are supplied to auxiliary correction coils which are arranged adjacent to main deflection coils and which have a smaller inductance relative to said main deflection coils.

5. A projection television apparatus having three monochromatic picture tubes disposed in a planar orientation defining a central picture tube and two outer picture tubes, each of said picture tubes including a deflection unit responsive to deflection currents and raster correction signals for vertical and horizontal deflection, the apparatus comprising:

means for supplying vertical and horizontal raster correction signals formulated for said central picture tube to all three of said picture tubes, said means for supplying said vertical and horizontal raster correction signals formulated for said central picture tube to said two outer picture tubes having conductive paths each having a variable resistor; and, means for supplying additional vertical and horizontal raster correction signals respectively formulated only for said two outer picture tubes to said two outer picture tubes, respectively.

6. An improved projection television apparatus having three monochromatic picture tubes disposed in a planar orientation defining a central picture tube and two outer picture tubes, each of said picture tubes including for vertical and horizontal deflection main deflection coils responsive to deflection currents and auxiliary deflection coils responsive to raster correction signals, the auxiliary correction coils being arranged adjacent to the main deflection coils and having an appreciably smaller inductance relative to said main deflection coils, and the raster correction signals having certain approximate amplitudes, the improved apparatus comprising:

means for supplying vertical and horizontal raster correction signals formulated for said central picture tube to all three of said picture tubes; and, means for supplying additional vertical and horizontal raster correction signals respectively formulated for said two outer picture tubes to said two outer picture tubes respectively, said additional vertical and horizontal raster correction signals having amplitudes corresponding to approximately 40% of said certain approximate amplitudes.

* * * * *